United States Patent
Wu

(10) Patent No.: US 12,507,223 B2
(45) Date of Patent: Dec. 23, 2025

(54) SUPPORTING DEVICES WITH DIFFERENT BANDWIDTH CAPABILITY IN A COMMUNICATION NETWORK

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 491 days.

(21) Appl. No.: 17/790,504

(22) PCT Filed: Dec. 29, 2020

(86) PCT No.: PCT/US2020/067389
§ 371 (c)(1),
(2) Date: Jun. 30, 2022

(87) PCT Pub. No.: WO2021/138376
PCT Pub. Date: Jul. 8, 2021

(65) Prior Publication Data
US 2023/0042361 A1    Feb. 9, 2023

Related U.S. Application Data

(60) Provisional application No. 62/955,375, filed on Dec. 30, 2019.

(51) Int. Cl.
*H04W 72/0453*   (2023.01)
*H04W 48/08*   (2009.01)
*H04W 74/00*   (2009.01)

(52) U.S. Cl.
CPC ....... *H04W 72/0453* (2013.01); *H04W 48/08* (2013.01); *H04W 74/006* (2013.01)

(58) Field of Classification Search
CPC ............. H04W 72/0453; H04W 48/08; H04W 74/006; H04W 48/12; H04L 5/001; H04L 5/0098
See application file for complete search history.

(56) References Cited

U.S. PATENT DOCUMENTS

| | | | |
|---|---|---|---|
| 2011/0085457 | A1 | 4/2011 | Chen et al. |
| 2013/0336260 | A1 | 12/2013 | Damnjanovic et al. |

(Continued)

FOREIGN PATENT DOCUMENTS

| | | |
|---|---|---|
| CN | 110603877 A | 12/2019 |
| EP | 1 799 004 A1 | 6/2007 |

(Continued)

OTHER PUBLICATIONS

Office Action for Indian Patent Application No. 202247039913, dated Nov. 16, 2022.

(Continued)

*Primary Examiner* — Afshawn M Towfighi
(74) *Attorney, Agent, or Firm* — MARSHALL, GERSTEIN & BORUN LLP

(57) ABSTRACT

To support devices with different bandwidth capabilities, a base station configures a first initial bandwidth part (BWP) of a first width within a bandwidth of the first cell (1002) and configures a second initial BWP of a second width, within the bandwidth of the first cell (1004). The base station transmits an indication of the first BWP in the first cell and an indication of the second BWP in the first cell or a second cell, to cause a first user equipment UE having a first bandwidth capability to access the first BWP, and a second UE having a second bandwidth capability to access the second BWP (1006).

15 Claims, 10 Drawing Sheets

(56) References Cited

U.S. PATENT DOCUMENTS

| | | |
|---|---|---|
| 2019/0104543 A1 | 4/2019 | Park |
| 2019/0124646 A1 | 4/2019 | Ly et al. |
| 2019/0166529 A1 | 5/2019 | Chen et al. |
| 2019/0223086 A1 | 7/2019 | Jung et al. |
| 2020/0221499 A1 | 7/2020 | Hofström et al. |
| 2021/0385814 A1* | 12/2021 | Abotabl ............ H04W 72/23 |
| 2022/0183009 A1* | 6/2022 | Yu .................. H04W 72/0446 |
| 2023/0062230 A1* | 3/2023 | He .................. H04W 72/0446 |

FOREIGN PATENT DOCUMENTS

| | | |
|---|---|---|
| EP | 3571803 A2 | 11/2019 |
| EP | 3573420 A1 | 11/2019 |
| WO | WO-2019/074337 A1 | 4/2019 |
| WO | WO-2019/095656 A1 | 5/2019 |
| WO | WO-2019/160481 A1 | 8/2019 |
| WO | WO-2020/145722 A1 | 7/2020 |

OTHER PUBLICATIONS

International Search Report and Written Opinion for Application No. PCT/US2020/067389, dated Apr. 9, 2021.

Panasonic, "On Default Bandwidth Part," 3GPP Draft (2017).

CATT, "Impact of NR Physical Design on RA," 3GPP Draft (2017).

Samsung, "Randome Access in NR—Flexible UE Bandwidth Aspects," 3GPP Draft (2017).

TSG RAN WG2, "LS on Supported BW for Initial BWP," 3GPP Draft (2019).

"Digital Cellular Telecommunications Systems (Phase 2+) (GSM); Universal Mobile Telecommunications System (UMTS); LTE; 5G; Release Description; Release 15," 3GPP TR 21.915 version 15.0.0 Release 15 (2019).

Lin, "A Primer on Bandwidth Parts in 5G New Radio," (2020).

First Examination Report for India Application No. 202247039913, dated Nov. 16, 2022.

First Office Action for Chinese Application No. 202080096508.X, dated Sep. 26, 2024.

Ericsson, "NR-Lite for Industrial Sensors and Wearables," 3GPP TSG-RAN Meeting #84 (2019).

Nokia, "New WID: Support of NR-Lite," 3GPP TSG RAN meeting #84 (2019).

Qualcomm Incorporated, "Lower NR UE capabilities," 3GPP TSG RAN Meeting #84 (2019).

Qualcomm, "NR-Lite for Rel-17 Qualcomm Views," 3GPP RAN #84 (2019).

Samsung, "Motivation for NR-Lite: IoT over NR," 3GPP TSG RAN Meeting #84 (2019).

Mediatek, "Bandwith Part Adapation," (2018).

* cited by examiner

SUPPORTING DEVICES WITH DIFFERENT BANDWIDTH CAPABILITY IN A COMMUNICATION NETWORK

FIELD OF THE DISCLOSURE

This disclosure relates to wireless communications and, more particularly, to managing bandwidth parts on the radio interface.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Base stations that operate according to fifth-generation (5G) New Radio (NR) requirements support significantly larger bandwidth than fourth-generation (4G) base stations. Accordingly, the Third Generation Partnership Project (3GPP) has proposed that for Release 15, user equipment units (UEs) support a 100 MHz bandwidth in frequency range 1 (FR1) and a 200 MHz bandwidth in frequency range (FR2). However, in at least some geographic regions, some UEs may have lower bandwidth capability, which can be referred to as mid-tier NR devices or NR-light devices. Examples of such UEs include wearable devices, Internet-of-things (IOT) devices, and head units of cars.

Due to the relatively wide bandwidth of a typical carrier, a 5G NR base station can configure a UE to operate within certain bandwidth parts (BWP), or a portion of the full carrier made up of a contiguous set of physical resource blocks. For example, the full carrier bandwidth may be 200 MHz, and the base station can configure a 100 MHz BWP for the UE. The BWP can include a downlink (DL) and an uplink (UL) components.

A base station can configure an initial BWP via which a normal-capability UE can access the radio access network (RAN), but which an NR-light UE may not support. On the other hand, if the base station configures a narrower initial BWP to allow NR-light UEs to access the cell, the base station reduces the data rate available to a normal-capability UE.

SUMMARY

To support both UEs with high-bandwidth capability as well as low-bandwidth capability, a base station of this disclosure configures at least two initial BWPs within a bandwidth of a certain cell. The base station can configure one initial BWP to have a relatively large width which high-bandwidth capability devices support but low-bandwidth capability devices do not support, and the other initial BWP to have a relatively small width which the low-bandwidth capability devices support. The high-bandwidth capability devices also support the narrower initial BWP but generally select the wider initial BWP to obtain a higher a data rate, unless there is a reason why selecting the wider BWP is not suitable in some cases.

In some implementations or scenarios, the base station configures the two BWPs within the same cell. The narrower BWP can be entirely within the wider BWP, partially overlap the wider BWP, or have no overlap with the wider BWP. The base station can indicate the locations of the initial BWPs in a system information block (SIB) which the base station broadcasts in the cell. A UE can select an initial BWP among the initial BWPs specified in the SIB, based on the UE's bandwidth capability.

In other implementations or scenarios, the base station configures the two BWPs in two different cells. The two cells can cover substantially the same geographic area, so that a UE in most cases can detect the SIB of the first cell as well as the SIB of the second cell. In this case, the overall bandwidth of the second cell can be narrower than the overall bandwidth of the first cell. The overall bandwidth of the second cell can be entirely within the initial BWP of the first cell, partially overlap the initial BWP of the first cell, or have no overlap with the initial BWP of the first cell. Further, the initial BWP of the second cell can be entirely within the wider initial BWP of the first cell, partially overlap the initial BWP of the first cell, or have no overlap with the initial BWP of the first cell.

After selecting an initial BWP based at least in part on bandwidth capability, a UE can transmit a random access preamble to the base station on the UL component of the selected initial BWP in order to access the cell, which can be the first cell or the second cell as discussed above. The base station can transmit a random access response and on the DL component of the selected initial BWP. The base station subsequently can provide non-initial BWP configurations to the UE that can be wider than or narrower than the bandwidth of the initial BWP configurations. Thus, a non-initial BWP configuration for a low-bandwidth capability UE can include one or more narrower BWP(s), and a non-initial BWP configuration for a high-bandwidth capability UE can include a narrower or wider BWP(s).

One example embodiment of these techniques is a method in a base station for supporting devices with different bandwidth capabilities. The method can be executed by processing hardware and includes configuring a first initial bandwidth part (BWP) of a first width within a bandwidth of the first cell, configuring a second initial BWP of a second width different than the first width, within the bandwidth of the first cell, and transmitting an indication of the first BWP in the first cell and an indication of the second BWP in the first cell or a second cell, to cause a first user equipment (UE) having a first bandwidth capability to access the first BWP, and a second UE having a second bandwidth capability to access the second BWP.

Another example embodiment of these techniques is a base station including processing hardware configured to execute the method above.

Yet another example embodiment of these techniques is a method in a UE for accessing a radio access network (RAN). The method can be executed by processing hardware and includes receiving configuration indicating a first initial BWP of a first width and a second initial BWP of a second width, selecting one of the first initial BWP or the second initial BWP in view of a bandwidth capability of the UE, and accessing the RAN via the selected initial BWP Still another embodiment of these techniques is a UE including processing hardware configured to execute the method above.

DETAILED DESCRIPTION OF THE DRAWINGS

Generally speaking, the techniques of this disclosure allow UEs with different bandwidth capability to access a RAN via respective BWPs, without the base station limiting the data rate of the high-bandwidth UEs. To this end, the base station configures BWPs of different widths in one or multiple overlapping cells.

Figure 1A:
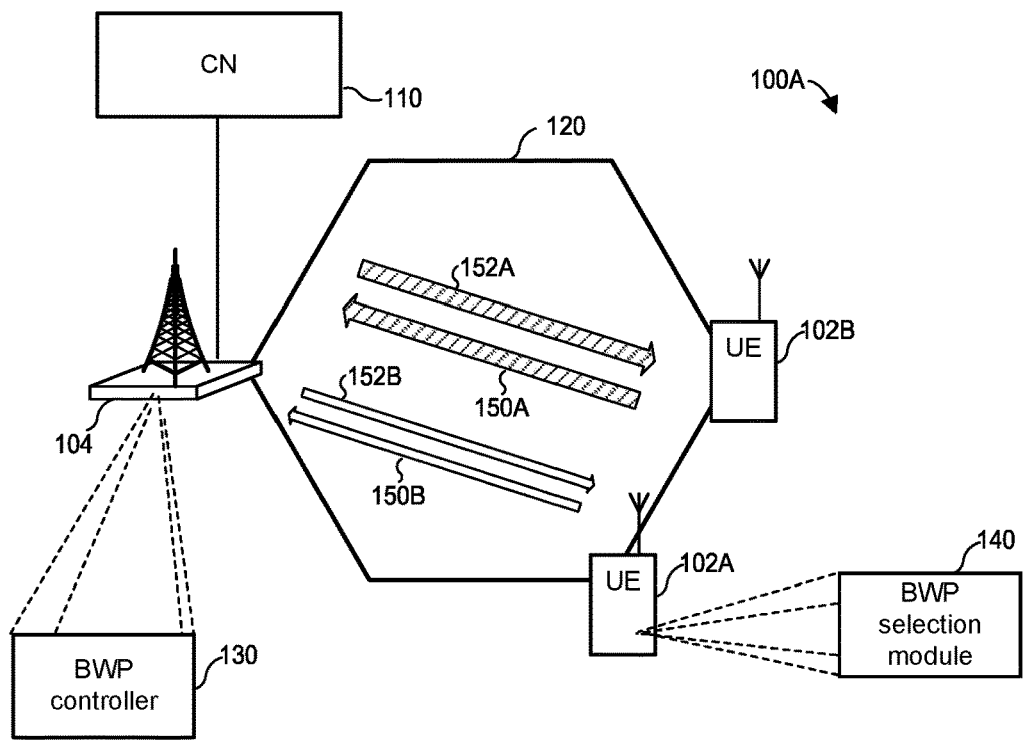
FIG. 1A is a block diagram of an example communication system in which a base station configures bandwidth parts (BWPs) of different widths in a certain cell, for access by devices with different bandwidth capabilities.

In an example communication network 100A of FIG. 1A, a UE 102A has high bandwidth capability, and a UE 102B has low bandwidth capability. For example, the UE 102A can conform to the evolved mobile broadband (eMBB) requirements for 5G NR of 3GPP Release 15 and support a 100 MHz BW in FR1 for bands where 100 MHz channel is available, support a 200 MHz BW in FR2, support four-layer multiple input, multiple output (MIMO) functionality in high bands in FR1, and support all CORESET #0 BWs as defined in TS 38.213. The UE 102B can support none or only some of these requirements. More generally, the UE 102A can support DL bandwidth of a certain threshold width $BW_{DL}$ and UL bandwidth of a certain threshold width $BW_{UL}$, whereas the UE 102B can support DL bandwidth of a width less than $BW_{DL}$ and/or UL bandwidth of a width less $BW_{UL}$.

The wireless communication network 100A includes an NR base station 104 connected to a core network (CN) 110, which can be implemented as an evolved packet core (EPC) or a fifth-generation core (5GC). The base station 104 operates as a fifth-generation Node B (gNB) and covers an NR cell 120.

The base station 104 configures an initial uplink (UL) BWP 150A, an initial downlink (DL) BWP 152A, an initial UL BWP 150B, and an initial DL BWP 152B in the cell 120. As used in this disclosure, the term "uplink" refers to the direction of transmission from a UE to the base station 104, and the term "downlink" refers to the direction of transmission from the base station 104 to a UE. The components 150A and 152A make up a first, wider initial BWP of the cell 120, and the components 150B and 152B make up a second, narrower initial BWP of the cell 120. The initial UL BWP 150A is wider than the initial UL BWP 150B, and the initial DL BWP 152A is wider than the initial DL BWP 152B. To continue with the example above, width(UL BWP 150A) $\geq BW_{UL}$, width(DL BWP 152A)$\geq BW_{DL}$, width(UL BWP 150B)$<BW_{UL}$, and width(DL BWP 152B)$<BW_{DL}$. In other cases, however, only one of the uplink and downlink components of the first initial BWP is wider than the corresponding component of the second initial BWP. Thus, for example, the base station 104 can configure the initial DL BWP 152A to be wider than the initial DL BWP 152B, and can configure the initial UL BWP 150A to be of the same width as the initial UL BWP 150B.

The base station 104 can be equipped with processing hardware that can include one or more general-purpose processors (e.g., CPUs) and a non-transitory computer-readable memory storing instructions that the one or more general-purpose processors execute. Additionally or alternatively, the processing hardware can include special-purpose processing units. To manage configuration of the initial BWPs and non-initial BWPs, the base station 104 includes a BWP controller 130, implemented using any suitable combination of hardware, software, and firmware. For example, the BWP controller 130 can be implemented as a set of instructions that execute on one or more processors to execute the corresponding functions. In another implementation, the BWP controller 130 is implemented using firmware as a part of the wireless communication chipset.

The UEs 102A and 102B also can be equipped with processing hardware that can include one or more general-purpose processors (e.g., CPUs) and a non-transitory computer-readable memory storing instructions that the one or more general-purpose processors execute. Additionally or alternatively, the processing hardware 150 can include special-cial-purpose processing units. The processing hardware can include a BWP selection module 140, which can be implemented using any suitable combination of hardware, software, and firmware.

Figure 1B:
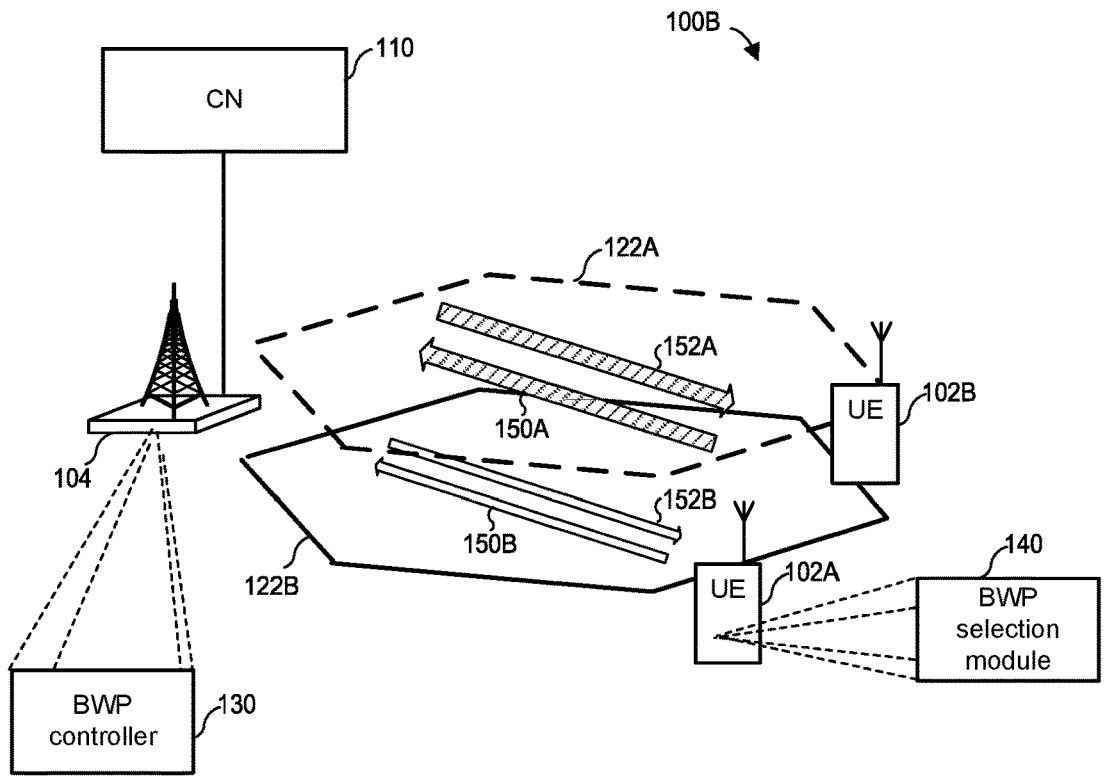
FIG. 1B is a block diagram of an example communication system in which a base station configures at least two cells, each with a BWP of a different respective width.

According to another implementation illustrated in FIG. 1B, the base station 104 configures a cell 122A and a cell 122B to cover substantially the same geographic area. In some implementations or scenarios, the base station 104 can configure the cell 122B to cover a larger geographic area than the cell 122A. The base station 104 assigns the initial UL BWP 150A and the initial DL BWP 152A to the cell 122A, and the initial UL BWP 150B and the initial DL BWP 152B to the cell 122B. Both the UE 102A and the UE 102B can detect the initial BWPs of the cells 122A and 122B, determine the width of the corresponding initial BWP, and select the initial BWP (and, accordingly, the cell) in view of the bandwidth capability of the UE.

As discussed in more detail below, the BWP controller 130 in operation allocates the first initial BWP and the second initial BWP, in a single cell as illustrated in FIG. 1A or in separate cells as illustrated in FIG. 1B. The base station 104 transmits one or more system information blocks (SIBs) to indicate the initial BWPs. After accessing the corresponding cell, the UE 102A or the UE 102B can request a non-initial BWP, which the base station 104 can assign in view of the width of the initial BWP. Thus, after the UE 102A selects the wider initial BWP, the base station 104 subsequently allocates a wider non-initial BWP to the UE 102A. After the UE 102B selects the narrower initial BWP, the base station 104 subsequently allocates a narrower non-initial BWP to the UE 102B. For example, the UE 102A can request a non-initial BWP wider than the first initial BWP if the UE 102A requires a higher data rate for one or more services. The UE 102B can request a non-initial BWP narrower than the second initial BWP if the UE 102a requires a lower data rate for a service. Alternatively, the base station 104 can assign a non-initial BWP to the UE 102A or the UE 102B even when the UE 102A or the UE 102B does not request a non-initial BWP. For example, the base station 104 may assign a non-initial BWP wider than the first initial BWP to the UE 102A if the base station 104 determines that the UE 102A requires a higher data rate. The base station 104 may assign a non-initial BWP wider than the second initial BWP to the UE 102B if the base station 104 determines that the UE 102B requires a lower data rate.

Initial BWP configuration and access to one or more cells of the base station 104 are discussed next with reference to FIGS. 2 and 3.

Figure 2:
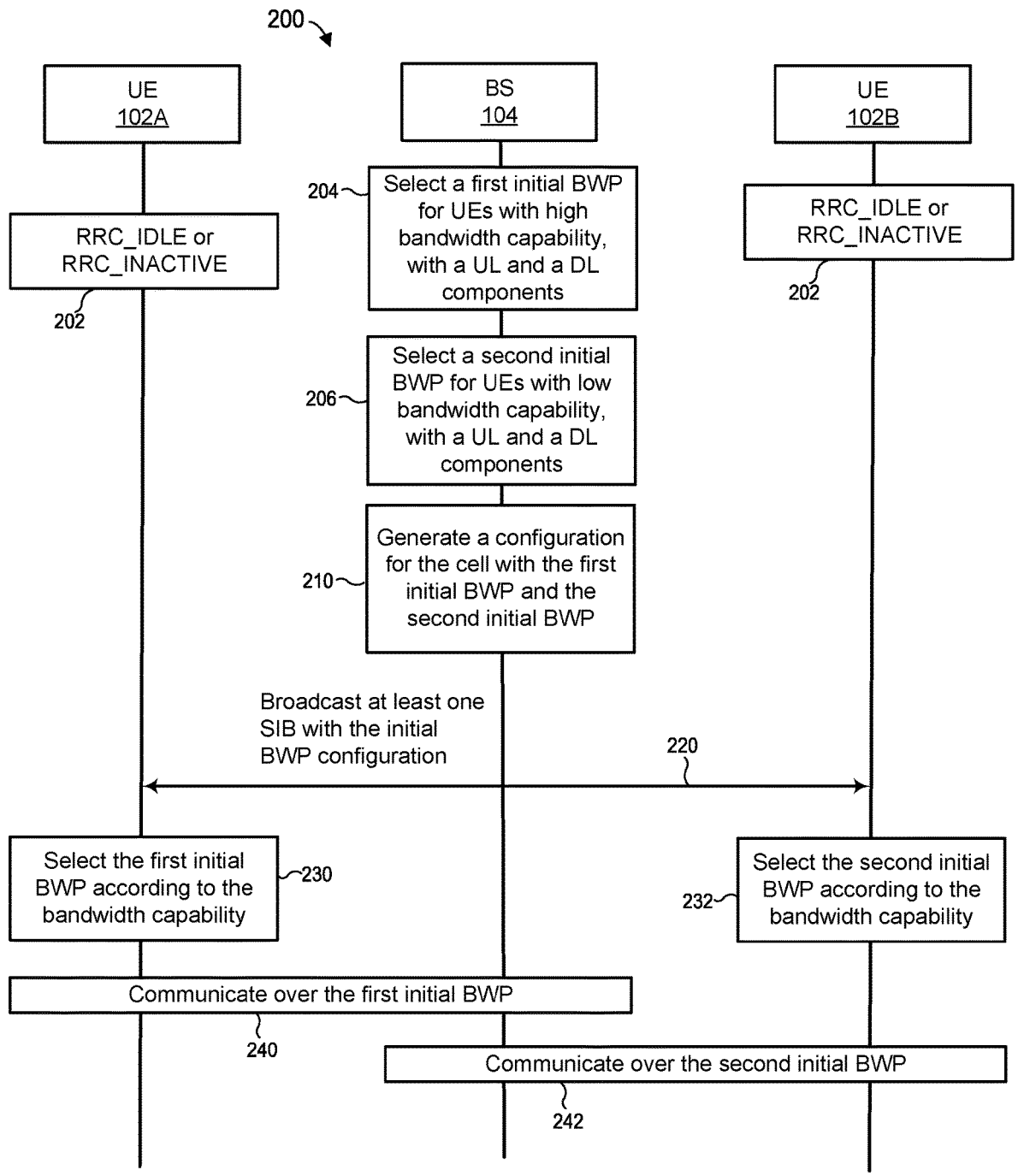
FIG. 2 is a messaging diagram of an example scenario in which the base station of FIG. 1A configures a first and second BWPs in a same cell, and UEs with different bandwidth capabilities access the RAN via the different BWPs of the cell.

Referring first to a scenario 200 of FIG. 2, the UE 102A and the UE 102B initially operate 202 in the state in which there is no active radio connection between the UE and the base station, according to a protocol for controlling radio resources on a radio interface such as Radio Resource Control (RRC). As a more specific example, the UE 102A and the UE 102B can operate 202 in the RRC_IDLE or RRC_INACTIVE state.

The base station 104 selects 204 a first initial BWP for UEs with high bandwidth capability. For example, referring back to FIG. 1, the first initial BWP can include the initial UL BWP 150A and the initial DL BWP 152A. The base station 104 also selects 206 a second initial BWP for UEs with low bandwidth capability. The second initial BWP for example can include the initial UL BWP 150B and the initial DL BWP 152B. Example configurations of BPWs are discussed in more detail with reference to FIGS. 4A-5C.

Depending on the implementation, the DL and UL carrier frequencies of a first initial BWP or of the second initial BWP may be the same (e.g., Time-Division-Duplex (TDD) carrier frequencies) or different (Frequency-Division-Duplex (FDD) carrier frequencies). The DL and UL carrier frequencies in some configurations can be partially overlapping. In some cases, the DL carrier frequency of an initial BWP can include the UL carrier frequency of the initial BWP.

The base station 104 generates 210 a configuration for the cell (e.g., the cell 120 of FIG. 1A) that includes the first initial BWP and the second initial BWP. This configuration can include an indication of where within the bandwidth of the cell the base station 104 has allocated the first initial BWP and the second initial BWP (see FIGS. 4A-C below). More specifically, the configuration indicates the location of the first initial DL BWP within the DL carrier frequency of the cell as well as the location of the first initial UL BWP within the UL carrier frequency of the cell. The base station 104 can broadcast 220 one or more SIBs including indications of where in the bandwidth of the cell the first initial BWP and the second initial BWP are located.

In some implementations, the base station 104 transmits a first synchronization signal (SS) block (SSB) on the first initial DL BWP. On the second initial DL BWP, the base station 104 can transmit the same first SSB, or a second SSB, or not transmit an SSB at all. The first SSB in an example implementation is made up of a first primary SS (PSS), a first physical broadcast channel (PBCH) (or a first master information block (MIB)) and a first secondary SS (SSS). The base station 104 can generate the first PSS or the first SSS associated with the physical cell identity (PCI) of the cell. The MIB the base station 104 transmits on the first initial DL BWP can include a first physical downlink control channel (PDCCH) configuration (e.g., PDCCH-ConfigSIB1) for a high bandwidth capability UE to receive the at least one SIB or other SIB(s) on the first initial DL BWP.

With continued reference to FIG. 2, the UE 102A camps on the cell of the base station 104 and selects 230 the first initial BWP. More particularly, the UE 102A camping on a cell monitors the control channel of the cell, such as the PBCH, to detect an MIB. The UE 102A then retrieves a PDCCH configuration from the MIB and receives one or more SIBs in accordance with the PDCCH configuration. The UE 102A can receive at least one downlink control information (DCI) from the base station 104 on one or more PDCCHs allocated in the first initial DL BWP. At least some of these DCIs can include a configuration for one or more physical uplink shared channel (PUSCH) transmissions, and at least some of these DCIs can include a configuration for one or more physical downlink shared channel (PDSCH) transmissions.

The UE 102A receives the at least one SIB according to a PDCCH configuration. In one implementation, the UE 102A receives the other SIB(s) according to the PDCCH configuration. In another implementation, if the at least one SIB contains a third PDCCH configuration (where second PDCCH configuration is associated with the second initial BWP), the UE 102A can receive the other SIB(s) according to the third PDCCH configuration.

In some implementations, the first PDCCH configuration includes a configuration for a first control resource set (CORESET) within the first initial DL BWP. The UE 102A can receive DCI(s) on a PDCCH on the first CORESET and receive one or more of the at least one SIB or the other SIB(s) on PDSCH(s) assigned by the DCI(s). The third PDCCH configuration can configure another CORESET within the first initial DL BWP. The UE 102A can receive DCI(s) on PDCCH(s) on the other CORESET and receive one or more of the other SIB(s) on PDSCH(s) assigned by the DCI(s).

The base station 104 can transmit the at least one SIB on the first initial DL BWP, the second initial DL BWP, or both the first and second initial BWPs. Accordingly, the UE 102A and the UE 102B can receive the at least one SIB on the first initial DL BWP, the second initial DL BWP, or both. When the base station 104 transmits the at least one SIB on the first initial DL BWP, the base station 104 selects a frequency resource such that the UE 102B, which has lower bandwidth capability, still can receive the at least one SIB.

As indicated above, the base station 104 in some implementations includes the first and second initial DL BWP configurations along with the first and second initial UL BWP configurations in a SIB such as SIB 1. The base station 104 can broadcast the SIB on the first initial DL BWP, the second initial DL BWP, or both. In addition to the first and second initial BWP configurations, the base station 104 can include other configurations in the SIB. Further, in some cases, the base station broadcasts the same content of the other configurations in a SIB on the first initial DL BWP and in a SIB on the second initial DL BWP. In other cases, the base station 104 broadcasts different other configurations in the SIB on the first initial DL BWP and in the SIB on the second initial DL BWP.

In some implementations, base station 104 broadcasts 220 a first SIB (e.g., SIB1) and a second SIB (e.g., SIBX, where X is an integer larger than 1) as a part of the one or more SIBs. The base station 104 includes the first initial DL BWP configuration and the first initial UL BWP configuration in the first SIB and the second initial DL BWP configuration and the second initial UL BWP configuration in the second SIB. In one implementation, the base station 104 can broadcast the first SIB and the second SIB on the first initial DL BWP, the second initial DL BWP, or both. In another implementation, the base station 104 can broadcast the first SIB and the second SIB on the first initial DL BWP and the second initial DL BWP respectively.

Examples of SIBs the base station 104 can broadcast 220 can include an SIB2, which contains cell re-selection information, mainly related to the serving cell; an SIB3, which contains information about the serving frequency and intra-frequency neighboring cells relevant for cell re-selection (including cell re-selection parameters common for a frequency as well as cell specific re-selection parameters); SIB4, which contains information about other frequencies of the RAT of the cell (e.g., NR) and inter-frequency neighboring cells relevant for cell re-selection (including cell re-selection parameters common for a frequency as well as cell specific re-selection parameters); SIB5, which contains information about frequencies of a less advanced RAT (e.g., E-UTRA) frequencies and less-advanced-RAT neighboring cells relevant for cell re-selection (including cell re-selection parameters common for a frequency as well as cell specific re-selection parameters); an SIB6, which contains an Earthquake and Tsunami Warning System (ETWS) primary notification; SIB7, which contains an ETWS secondary notification; an SIB8, which contains a Commercial Mobile Alert System (CMAS) warning notification; and a SIB9, which contains information related to Global Positioning Service (GPS) time and Coordinated Universal Time (UTC). The base station 104 can broadcast one or more of these SIBs on the first initial DL BWP, the second initial DL BW, both, and the base station 104 can broadcast the same content or different content on the first and second initial BWPs.

After the UE 102A selects 230 the first initial BWP, the UE 102A begins to communicate 240 with the base station 104 over the first initial BWP. The UE 102A for example transmits a random access preamble on the UL component of the selected initial BWP and receives a random access response on the DL component of the selected initial BWP. The UE 102A can generate one or more transmissions on one or more PUSCHs allocated in the UL portion of the first initial BWP and receive one or more transmissions on one or more PDSCHs allocated in the DL portion of the first initial BWP. Further, the UE 102A can transmit a HARQ feedback (e.g., HARQ ACK or HARQ NACK) for each of PDSCH transmissions from the base station 104 on the first initial DL BWP. As another example, the base station 104 during the event 240 can transmit a paging message on the first initial DL BWP to page the UE 102A.

The UE 102B camps on the same cell of the base station 104 but, unlike the UE 102A, selects 232 the second initial BWP. The UE 102B retrieves the PDCCH configuration from the MIB and receives one or more SIBs in accordance with the PDCCH configuration. The UE 102B can receive at least one DCI from the base station 104 on one or more PDCCHs allocated in the second initial DL BWP. Thus, the UE 102A and the UE 102B receive different DCIs. At least some of the DCIs the UE 102B receives include a configuration for one or more PUSCH transmissions, and at least some of these DCIs can include a configuration for one more PDSCH transmissions.

When the UE 102B camps on the second initial DL BWP, the UE 102B also can receive the at least one SIB on the first initial DL BWP according to the first PDCCH configuration. If the base station 104 broadcasts the first MIB on the second initial DL BWP, the UE 102B camping on the second initial DL BWP can receive the at least one SIB on the second initial DL BWP according to the first PDCCH configuration.

As indicated above, the base station 104 can transmit a second SSB on the second initial BWP. The second SSB can include a second PSS, a second PBCH (or a second MIB), and a second SSS. The second MIB may include a second PDCCH configuration (e.g., PDCCH-ConfigSIB1) for a UE with low bandwidth capability (such as the UE 102B) to receive the at least one SIB, or another SIB(s) the base station 104 can broadcast on the second initial DL BWP. In one implementation, the UE 102B can receive the other SIB(s) according to the second PDCCH configuration. In another implementation, if the at least one SIB contains another, fourth PDCCH configuration, the UE 102B can receive the other SIB(s) according to the fourth PDCCH configuration.

In some implementations, the second PDCCH configuration configures a second CORESET within the second initial DL BWP. The UE 102B can receive DCI(s) on PDCCH(s) on the second CORESET and receive one or more of the at least one SIB or the other SIB(s) on PDSCH(s) assigned by the DCI(s). The fourth PDCCH configuration configures a fourth CORESET within the second initial DL BWP. The UE 102B can receive DCI(s) on PDCCH(s) on the fourth CORESET and receive one or more of the other SIB(s) on PDSCH(s) assigned by the DCI(s).

After the UE 102B selects 232 the second initial BWP, the UE 102B begins to communicate 242 with the base station 104 over the second initial BWP. The UE 102B for example transmits a random access preamble on the UL component of the selected initial BWP and receives a random access response on the DL component of the selected initial BWP. The UE 102B can generate one or more transmissions on one or more PUSCHs allocated in the UL portion of the second initial BWP and receive one or more transmissions on one or more PDSCHs allocated in the DL portion of the second initial BWP. Further, similar to the UE 102A, the UE 102B can transmit a HARQ feedback (e.g., HARQ ACK or HARQ NACK) for each of PDSCH transmissions from the base station 104 on the second initial DL BWP. As another example, the base station 104 during the event 242 can transmit a paging message on the second initial DL BWP to page the UE 102B.

Further, during the event 240 or 242, the UE 102A or 102B can generate a HARQ transmission of a medium access control (MAC) protocol data unit (PDU) during a PUSCH transmission, or receive a HARQ transmission of a MAC PDU during a PDSCH transmission. The MAC PDU can include for example a Radio Resource Control (RRC) message, a radio link control (RLC) PDU, a packet data convergence protocol (PDCP) PDU, or an internet protocol (IP) packet. As a more particular example, the UE 102A or 102B can generate such RRC messages as RRC Setup Request, RRC Resume Request, RRC Reestablishment Request, RRC Setup Complete, RRC Resume Complete, RRC Reestablishment Complete, or RRC Reconfiguration Complete. The UE 102A or 102B also can generate a Measurement Report message, a UL Information Transfer message or a UE Assistance Information message. Further, the base station 104 during the event 242 or 242 can generate such RRC messages RRC Setup, RRC Resume, RRC Reestablishment, or RRC Reconfiguration, or generate a DL Information Transfer message.

Thus, in the scenario 200, the base station 104 causes two UEs with different bandwidth capabilities to access the base station 104 via different BWPs of different respective width. The UE 102A, which has high bandwidth capability, accesses the base station 104 via a wider BWP and thus can obtain a high data rate. On the other hand, the base station 104 also provides a narrower BWP to support the UE 102B, which has low bandwidth capability, without requiring that the UE 102A also access the base station 104 via the narrower BWP and communicate at a lower data rate.

Figure 3:
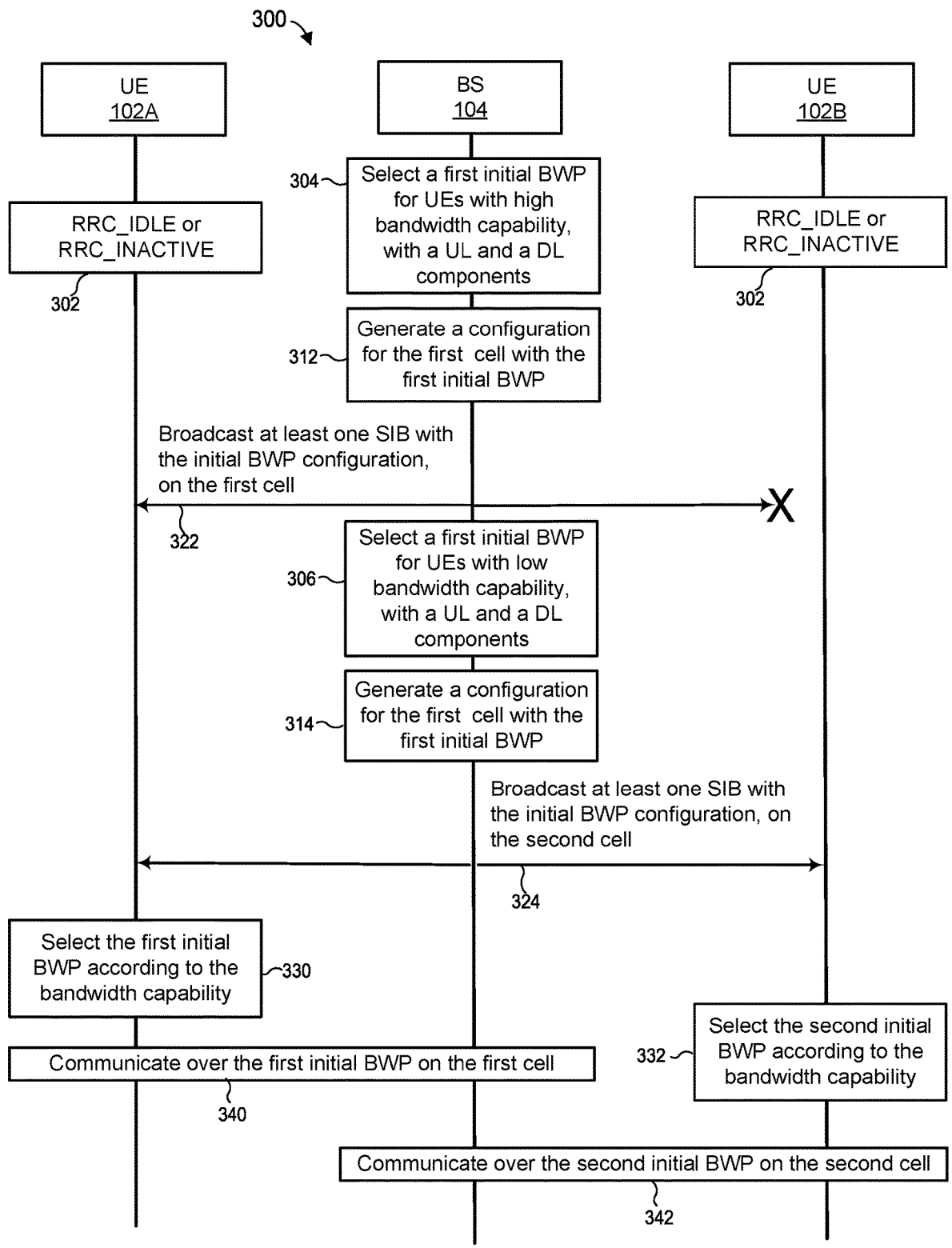
FIG. 3 is a messaging diagram of an example scenario in which the base station of FIG. 1B configures a first and second BWPs in different cells, and UEs with different bandwidth capabilities access the RAN via the different cells.

Now referring to a scenario 300 illustrated in FIG. 3, the UEs 102A and 102B initially operate 302 in the RRC_IDLE state, RRC_INACTIVE state, or more generally in a state in which there is no active radio connection between the UE and the base station 104. Similar to the scenario 200, the base station 104 in this scenario selects 304 a first initial BWP and selects 306 a second initial BWP. Also similar to the scenario 200, the first initial BWP can be sufficiently wide to support UEs with high bandwidth capability, and the second initial BWP can be narrow and support UEs with low or high bandwidth capability.

The base station 104 generates 312 a configuration for a first cell (e.g., the cell 122A of FIG. 1B) including the first initial BWP. The base station 104 assigns a first physical cell identity (PCI) to the first cell. The base station 104 also generates 314 a configuration for a second cell (e.g., the cell 122B of FIG. 1B) including the second initial BWP. The base station 104 assigns a second PCI to the second cell. The first cell and the second cell can cover the same geographic area or the second cell can cover a larger geographic area than the first cell. The base station 104 can allocate the second initial BWP of the second cell within the bandwidth of the first cell, as discussed in more detail with reference to FIGS. 4A-5C.

The base station 104 broadcasts 322 at least one SIB for the first cell, the SIB including a configuration of the first initial BWP but not the configuration of the second initial BWP. More particularly, the base station 104 transmits a first synchronization signal (SS) associated with the first PCI, which the UE 102A or the UE 102B can use for downlink slot or frame synchronization. The base station 104 transmits, on a PBCH, a MIB including PDCCH configuration (e.g., a PDCCH-ConfigSIB1 element) for the first cell.

Both the UE 102A and the UE 102B in the example scenario 300 can detect the first SS, but because the base station 104 broadcasts 322 the at least one SIB on a wide initial DL BWP, only the UE 102A with high bandwidth capability can properly receive 322 the at least one SIB. The UE 102B with low bandwidth capability cannot properly receive 322 the at least one SIB for the first cell.

The base station 104 also broadcasts 324 at least one SIB for the second cell, the SIB including a configuration of the second initial BWP in the second cell. The base station 104 transmits a second SS associated with the second PCI, which the UE 102A or the UE 102B can use for downlink slot or frame synchronization and transmits, on a PBCH, a MIB including PDCCH configuration (e.g., a PDCCH-ConfigSIB1 element).

Both the UE 102A and the UE 102B can receive the second SS, and because the base station 104 broadcasts 324 the at least one SIB on a narrow initial DL BWP, both the UE 102A and the UE102B can receive 324 the at least one SIB for the second cell.

The UE 102A camps on the first cell of the base station 104 and selects 330 the first initial BWP, which provides the UE 102A with a higher data rate. The UE 102B camps on the second cell of the base station 104 and selects 332 the second initial BWP. After the UE 102A selects 330 the first initial BWP, the UE 102A begins to communicate 340 with the base station 104 over the first initial BWP. After the UE 102B selects 332 the second initial BWP, the UE 102B begins to communicate 342 with the base station 104 over the second initial BWP. Events 330, 332, 340, and 342 are generally similar to events 230, 232, 240, and 242 of FIG. 2, except for the initial BWPs belonging to the same cell in the scenario 200 but to different cell in the scenario 300.

When generating SSB transmissions, MIB transmission, SIB transmissions, etc., the base station 104 in the scenario 300 can implement techniques similar to those discussed above with reference to the scenario 200.

In the scenarios 200 and 300, the base station 104 can assign a non-initial BWP to the UE 102A and/or the UE 102B during the event 240, 242, 340, or 342. For example, the UE 102A can receive, over the DL component of the first initial BWP, an RRC message including a configuration of a first non-initial DL BWP and/or a configuration of a first non-initial UL BWP. The non-initial DL BWP and the non-initial UL BWP can be within the DL bandwidth and the UL bandwidth, respectively, of the corresponding cell. Depending on the scenario, the non-initial DL/UL BWP can include the initial DL/UL BWP, partially overlap with the initial DL/UL BWP, or not overlap with the initial DL/UL BWP. The base station 104 can allocate a non-initial DL BWP and/or a non-initial UL BWP in accordance with the bandwidth capability of the UE, so that for example a non-initial BWP for the UE 102B is sufficiently narrow and does not exceed the bandwidth capability of the UE 102B; on the other hand, the base station 104 allocates a wide non-initial BWP to the UE 102A (when available), so that the UE 102A can continue to operate at a high data rate.

According to one scenario, the UE 102A switches from the DL component of the initial BWP to the DL component of the non-initial BWP and/or the UL component of the initial BWP to the UL component of the non-initial BWP in response to receiving an RRC message configuring the non-initial BWP. In another scenario, the base station 104 transmits a command on a PDCCH directing the UE 102A to switch from the initial DL BWP to the non-initial DL BWP and/or from the initial UL BWP to the non-initial UL BWP. The UE 102A switches the non-initial DL BWP and/or the non-initial UL BWP in response to the command.

If the UE 102A switches from the first initial UL BWP to the non-initial UL BWP in response to the RRC message, the UE 102A can transmit an RRC message responsive to the received RRC message on the non-initial UL BWP. If the UE 102A does not switch from the first initial BWP, the UE 102A can transmit an RRC message responsive to the received RRC message on the first initial UL BWP.

In some implementations, the RRC message the UE 102A receives is RRC Setup message, RRC Resume message, or RRC Reconfiguration, and the RRC response message the UE 102A transmits in response is RRC Setup Complete, RRC Resume Complete, or RRC Reconfiguration Complete. The UE 102A transitions to RRC_CONNECTED (or, more generally, a state in which the UE 102A has an active radio connection with the base station) and in response transmits an RRC message such as RRC Setup Complete or RRC Resume Complete. The UE 102A operating in the RRC_CONNECTED state can receive an RRC Reconfiguration message and transmit an RRC Reconfiguration Complete message.

Figure 4A:
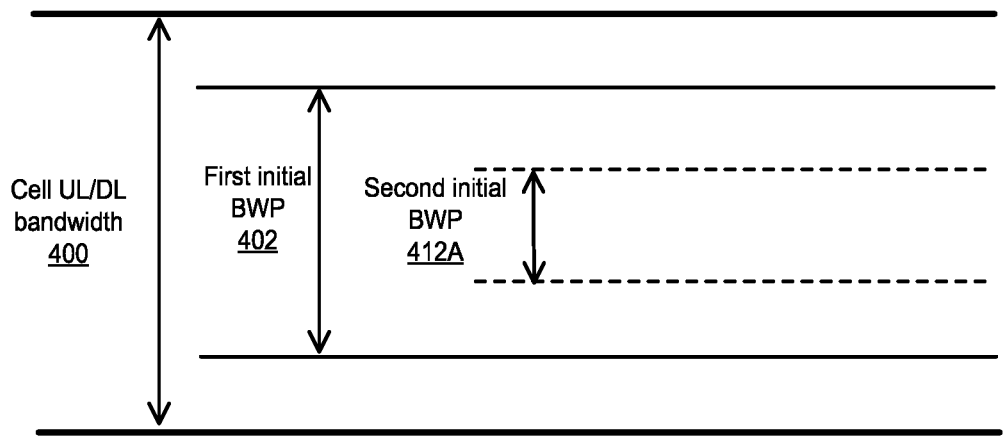
FIG. 4A schematically illustrates a configuration in which the narrower initial BWP is entirely within the wider initial BWP.
Figure 4B:
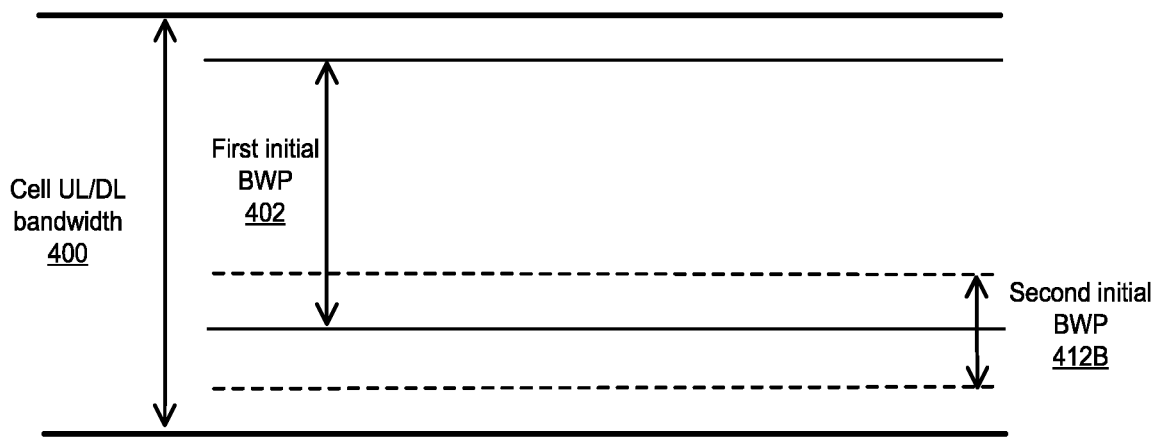
FIG. 4B schematically illustrates a configuration in which the narrower initial BWP partially overlaps the wider initial BWP.
Figure 4C:
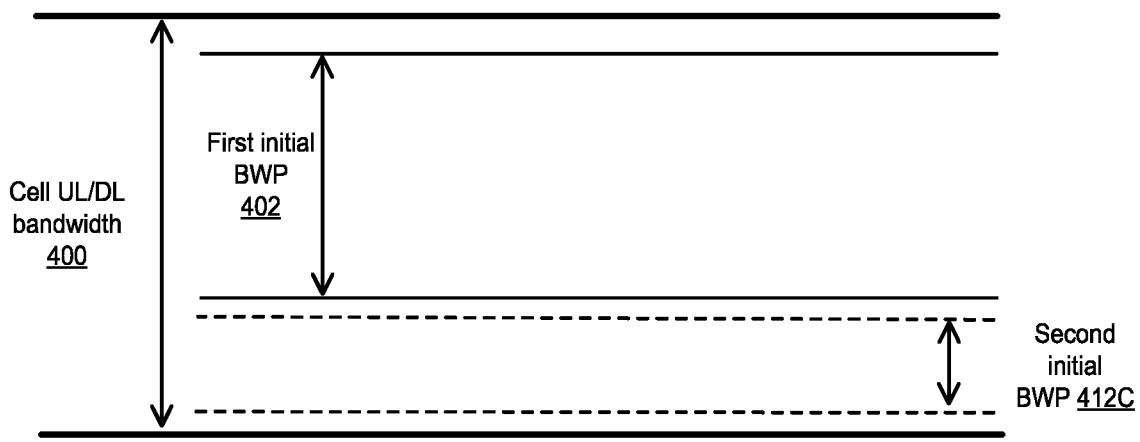
FIG. 4C schematically illustrates a configuration in which the narrower initial BWP and the wider initial BWP do not overlap.

As illustrated in FIGS. 4A-C, the width of the first initial BWP 402 can be greater than the width of the second initial BWP 412A-C. Both the first initial BWP 402 and the second initial BWP 412A-C are associated with the same cell, as in the scenario 200 discussed above with reference to FIG. 2, and both the first initial BWP 402 and the second initial BWP 412A-C are within the bandwidth 400 of the first cell. The first initial BWP 402 in these examples is narrower than the entire bandwidth 400 of the first cell, but in some implementations the DL portion of the initial BWP 402 can span the entire DL bandwidth of the first cell, and/or the UL portion of the initial BWP 402 can span the entire UL bandwidth of the first cell.

More specifically, the DL component of the first initial BWP 402 is sufficiently wide to support the UE 102A with a high receive (Rx) bandwidth capability. The DL component of the second initial BWP 412A on the other hand may not be sufficiently wide to support the UE 102A with a high Rx bandwidth capability. The DL component of the second initial BWP 412A is sufficiently narrow to support the UE 102B with a low Rx bandwidth capability, so that the UE 102B supports only the BWP 412A-C but not the BWP 402 for downlink communication. Additionally or alternatively, the UL component of the first initial BWP 402 is sufficiently wide to support the UE 102A with a high transmit (Tx) bandwidth capability. The UL component of the second initial BWP 412A-C on the other hand may not be sufficiently wide to support the UE 102A with a high Tx bandwidth capability. The UL component of the second initial BWP 412A-C is sufficiently narrow to support the UE 102B with a low Tx bandwidth capability, so that the UE 102B supports only the BWP 412A but not the BWP 402 for uplink communication.

In the example configuration of FIG. 4A, the second initial BWP 412A is entirely within the first initial BWP 402. In another example configuration of FIG. 4B, the second initial BWP 412B partially overlaps the initial BWP 402. In yet another example configuration of FIG. 4C, the first initial BWP 402 and the second initial BWP 412C do not overlap. In some implementations, the DL portion of the first initial BWP 402 and the DL portion of the second initial BWP 412A together span the entire DL bandwidth of the first cell, in an overlapping or non-overlapping manner. Similarly, in some implementations, the UL portion of the first initial BWP 402 and the UL portion of the second initial BWP 412A together span the entire UL bandwidth of the first cell, in an overlapping or non-overlapping manner.

Figure 5A:
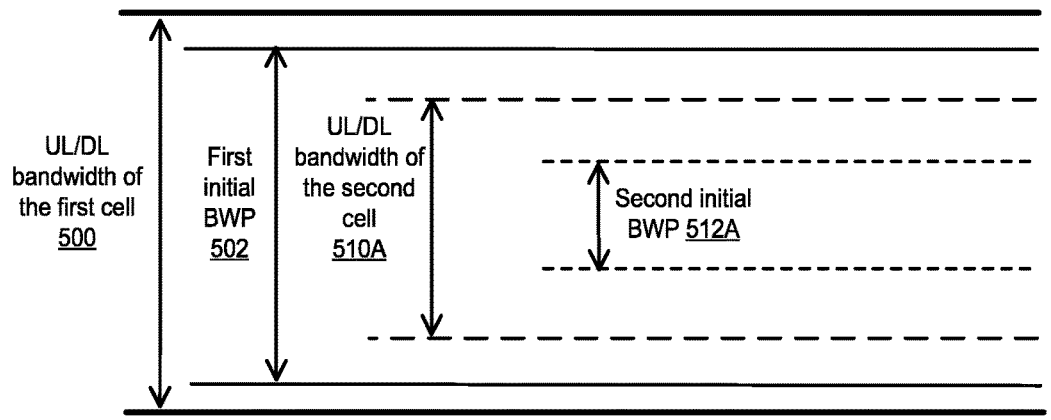
FIG. 5A schematically illustrates a configuration in which the narrower initial BWP of the second cell is entirely within the wider initial BWP of the first cell, and the bandwidth of the second cell is within the bandwidth of the first cell.
Figure 5B:
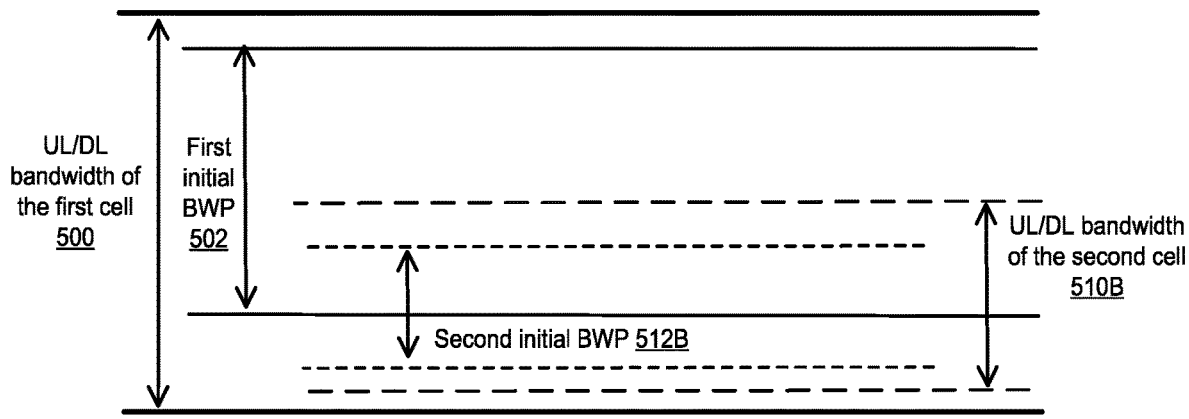
FIG. 5B schematically illustrates a configuration in which the narrower initial BWP of the second cell partially overlaps the wider initial BWP of the first cell, and the bandwidth of the second cell is within the bandwidth of the first cell.
Figure 5C:
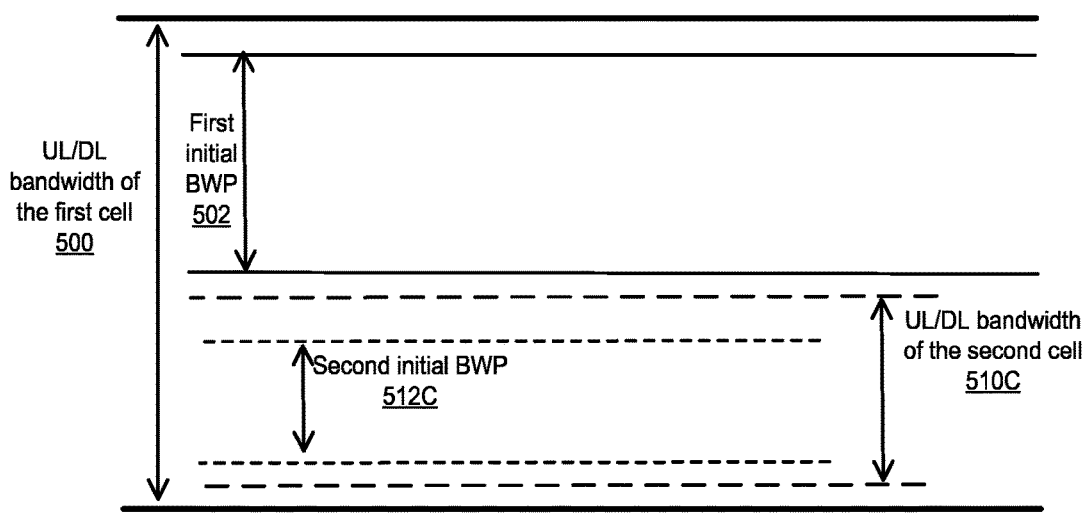
FIG. 5C schematically illustrates a configuration in which the narrower initial BWP of the second cell does not overlap the initial BWP of the first cell, and the bandwidth of the second cell is within the bandwidth of the first cell.

In the configurations of FIGS. 5A-C, a first initial BWP 502 is associated with a first cell, and a second initial BWP 512A-C is associated with a second cell, as in the scenario 300 discussed above with reference to FIG. 3. As in the configurations of FIGS. 4A-C, the width of the first initial BWP 502 is greater than the width of the second initial BWP 512A-C. However, both the first initial BWP 502 and the second initial BWP 512A-C are within the bandwidth 500 of the first cell.

In the example configuration of FIG. 5A, the second initial BWP 512A is entirely within the first initial BWP 502. The bandwidth 510A of the second cell is entirely within the bandwidth 500 of the first cell. Moreover, the bandwidth 510A of the second cell is entirely within the first initial BWP 502. In another example configuration of FIG. 5B, the bandwidth 510B of the second cell partially overlaps the first initial bandwidth 502. The second initial BWP 512B is within the bandwidth 510B of the second cell and partially overlaps the first initial BWP 502. In yet another example configuration of FIG. 5C, the first initial BWP 502 and the second initial BWP 512C do not overlap. In this configuration, the bandwidth 510C of the second cell is within the bandwidth 500 of the first cell but is entirely outside the first initial BWP 502.

In still another possible configuration, the base station 104 configures the bandwidth of the second cell to partially overlap the bandwidth of the first cell, and the initial BWP of the second cell to be entirely within the initial BWP of the first cell. According to yet another configuration, the bandwidth of the second cell partially overlaps the bandwidth of the first cell, but the initial BWP of the second cell is entirely outside the initial BWP of the first cell.

For further clarity, FIGS. 6-10 illustrate flow diagrams of several example methods than can be implemented in the UEs 102A and 102B or the base station 104.

Figure 6:
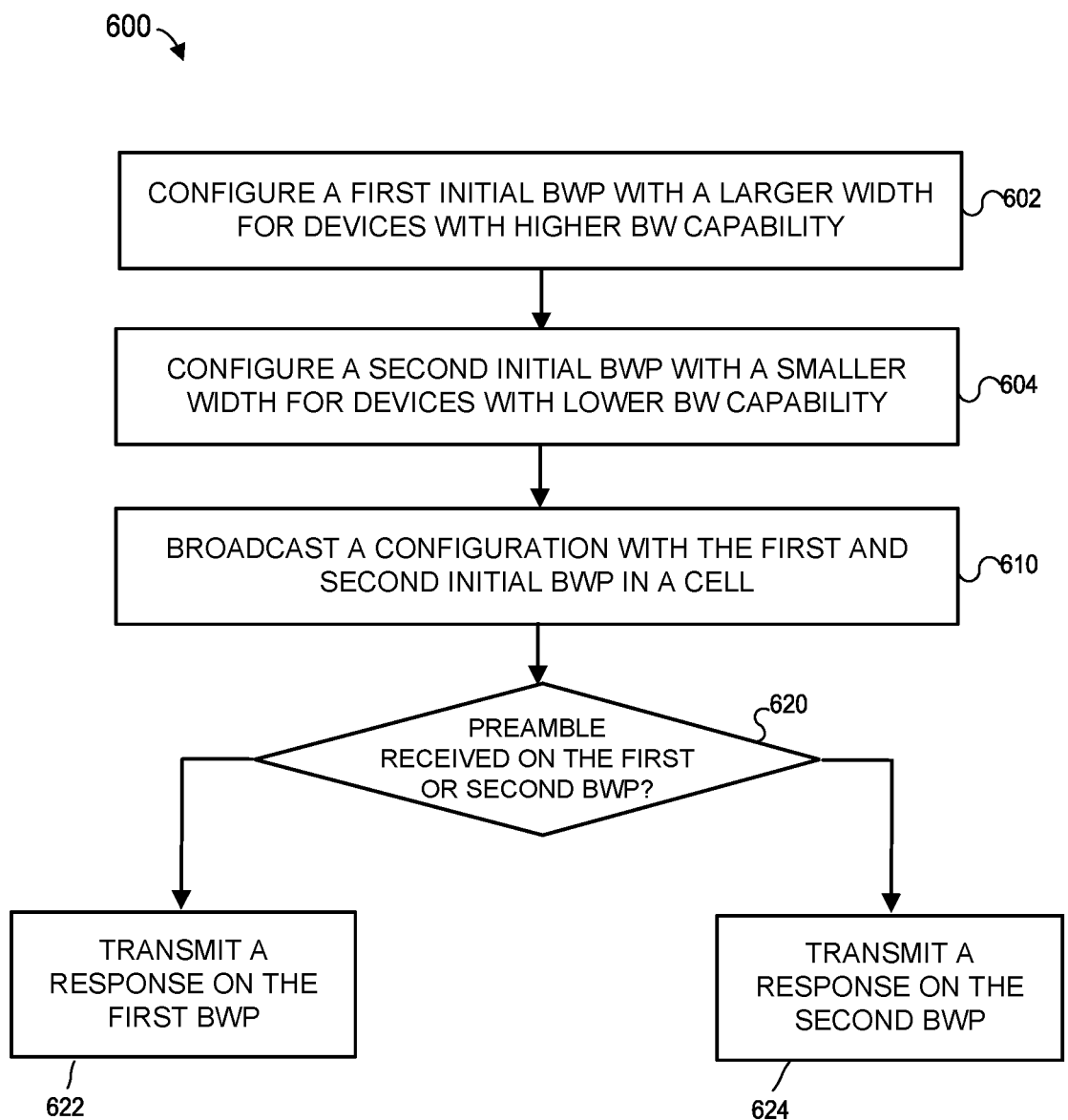
FIG. 6 is a flow diagram of an example method for configuring a first initial BWP and a second initial BWP, which can be implemented in the base station of FIG. 1A.

Referring first to FIG. 6, the base station 104 can implement an example method 600 for configuring a first initial BWP and a second initial BWP in a single cell, as illustrated in FIG. 1A and discussed with reference to FIG. 2. At block 602, base station 104 configures a first initial BWP with a larger width for UEs that have high bandwidth capability, such as the UE 102A (events 204 and 210 in FIG. 2). Next, at block 604, base station 104 configures a second initial BWP with a smaller width for UEs that have low bandwidth capability, such as the UE 102B (events 206 and 210 in FIG. 2). Next, at block 610, the base station 104 broadcasts the configuration for the first initial BWP and the second initial BWP, via one or more SIBs (event 220 in FIG. 2).

At block 620, the base station 104 determines whether a random access preamble arrives from a UE, such as the UE 102A or 102B, on the UL component of the first initial BWP or the UL component of the second initial BWP. If the base station 104 receives the random access preamble on the first initial BWP, the flow proceeds to block 622, where the base station 104 transmits a random access response on the DL component of the first initial BWP (event 240 in FIG. 2). Otherwise, if the base station 104 receives the random access preamble on the second initial BWP, the flow proceeds to block 624, where the base station 104 transmits a random access response on the DL component of the second initial BWP (event 242 in FIG. 2).

Figure 7:
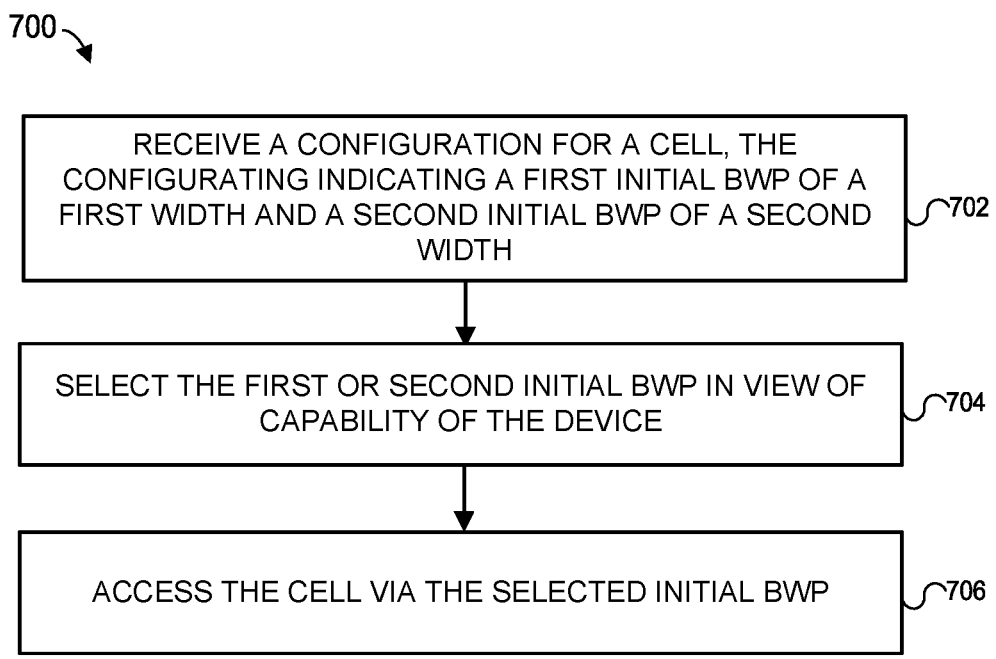
FIG. 7 is a flow diagram of an example method for accessing a cell via the first initial BWP or the second initial BWP, which can be implemented in a UE of FIG. 1A.

Next, FIG. 7 depicts a flow diagram of an example method 700 for accessing a cell via the first initial BWP or the second initial BWP, which can be implemented in the UE 102A or UE 102B for example. In particular, the UE 102A or 102B can implement the method 700 when the base station 104 configures both the first initial BWP and the second initial BWP in the same cell.

At block 702, the UE 102A or 102B receives a configuration for a cell including a first initial BWP of a first width and a second initial BWP of a second width (event 220 in FIG. 2). At block 704, the UE 102A or 102B selects the initial BWP in view of the bandwidth capability of the UE. Thus, the UE 102A can select the first initial BWP (event 230 in FIG. 2), and the UE102B can select the second initial BWP (event 232 in FIG. 2). At block 706, the UE 102A or 102B access the cell over the selected initial BWP. The UE 102A for example can access the cell via the first initial BWP (event 240 in FIG. 2), and the UE102B can access the cell over the second initial BWP (event 242 in FIG. 2).

Now referring to FIG. 8, the base station 104 can implement an example method 800 to configure a first initial BWP in a first cell and a second initial BWP in a second cell, as illustrated in FIG. 1B and discussed with reference to FIG. 3.

At block 802, the base station 104 configures a first initial BWP of a larger width for use by UEs that have high bandwidth capability (events 304 and 312 in FIG. 3). At block 804, the base station 104 configures a second initial BWP of a smaller width for use by UEs that have low bandwidth capability (events 306 and 314 in FIG. 3). The base station 104 at block 812 broadcasts a configuration including the first initial BWP in a first cell (event 322 in FIG. 3). At block 814, the base station 104 broadcasts a configuration including the second initial BWP in a second cell (event 324 in FIG. 3).

At block 820, the base station 104 determines whether a random access preamble arrives from a UE, such as the UE 102A or 102B, on the UL component of the first initial BWP in the first cell or the UL component of the second initial BWP in the second cell. If the base station 104 receives the random access preamble on the first initial BWP, the flow proceeds to block 832, where the base station 104 transmits a random access response on the DL component of the first initial BWP (event 340 in FIG. 3). Otherwise, if the base station 104 receives the random access preamble on the second initial BWP, the flow proceeds to block 834, where the base station 104 transmits a random access response on the DL component of the second initial BWP (event 342 in FIG. 3).

Figure 9:
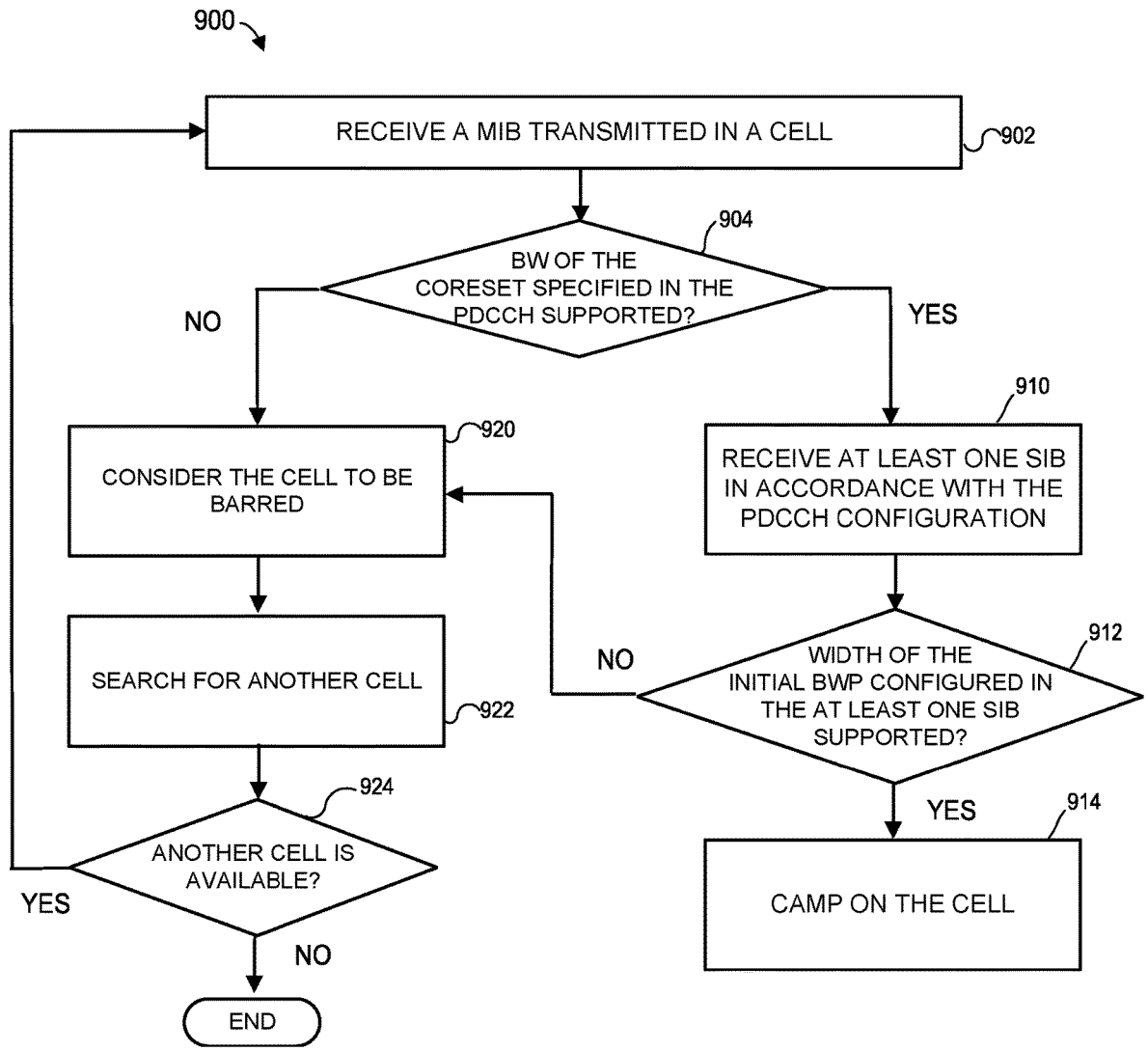
FIG. 9 is a flow diagram of an example method for accessing the first or the second cell via the first initial BWP or the second initial BWP, respectively, which can be implemented in the UE of FIG. 1B.

FIG. 9 is a flow diagram of an example method 900 for accessing the first or the second cell via the first initial BWP or the second initial BWP, respectively, which can be implemented in the UE 102A or 102B. In particular, the UE 102A or 102B can implement the method 900 when the base station 104 configures the first initial BWP and the second initial BWP in different respective cells, as illustrated in FIG. 1B.

At block 902, the UE 102A or 102B receives a MIB. In some implementations, each of the UE 102A and the UE 102B is capable of receiving a first MIB in the first cell (e.g., cell 122A for high bandwidth capability devices) and a second MIB in the second cell (e.g., cell 122B for low bandwidth capability devices). However, at block 904, the UE 102A or 102B determines whether the CORESET in the PDCCH specifies a bandwidth which the UE supports. For example, in one implementation, the base station 104 configures the first cell so that the CORESET occupies a wider bandwidth than the UE supports. As a more specific example, the CORESET in the first cell (e.g., cell 122A) can have the width the UE 102A supports but the UE 102B does not support.

If the UE determines at block 904 that the CORESET is within the UE's bandwidth capability, the flow proceeds to block 910. Otherwise, if the CORESET exceeds the UE's bandwidth capability, the flow proceeds to block 920, where the UE considers the cell to be barred. To continue with the example above, the UE 102B can consider the cell 122B to be barred.

At block 910, the UE receives at least one SIB in accordance with the PDCCH configuration (events 322 and 324 in FIG. 3). As discussed above, the SIB can specify an initial BWP configuration which can exceed the UE's bandwidth capability (event 322 in FIG. 3, as processed by the UE 102B) or can be within the UE's bandwidth capability (event 322 in FIG. 3, as processed by the UE 102A; event 324 in FIG. 3, as processed by the UE 102A or 102B). If the UE determines at block 912 that the width of the initial BWP exceeds the UE's bandwidth capability, the flow proceeds to block 920. Otherwise, the flow proceeds to block 914, where the UE camps on the cell (event 330 or 332 in FIG. 3).

After the UE determines that a cell is blocked at block 920, the UE searches for another cell at block 922. If another cell is available (block 924), the flow returns to block 902. Otherwise, the method 900 completes.

Figure 10:
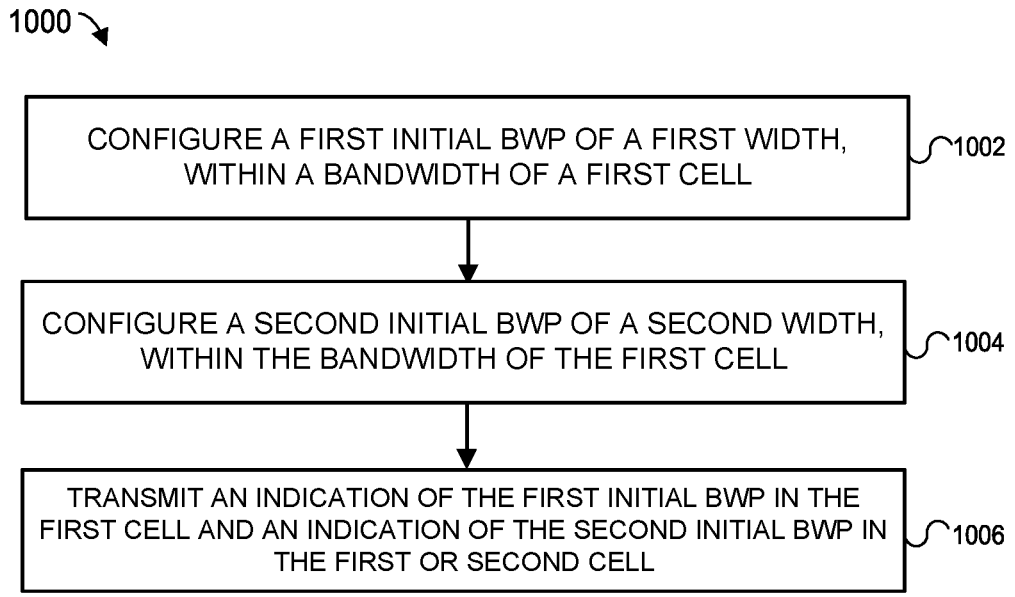
FIG. 10 is a flow diagram of an example method for providing access to a RAN to devices with different bandwidth capabilities, which can be implemented in the base station of FIG. 1A or 1B.

Next, FIG. 10 illustrates a flow diagram of an example method 1000 for providing access to a RAN to devices with different bandwidth capabilities, which can be implemented in the base station 104 of FIG. 1A or 1B. At block 1002, the base station 104 configures a first initial BWP of a first width (events 204 and 210 in FIG. 2; events 304 and 312 in FIG. 3; block 602 in FIG. 6; block 802 in FIG. 8). The first initial BWP is within the bandwidth of the first cell (intervals 402 and 400 in FIGS. 4A-C; intervals 502 and 500 in FIGS. 5A-C).

Figure 8:
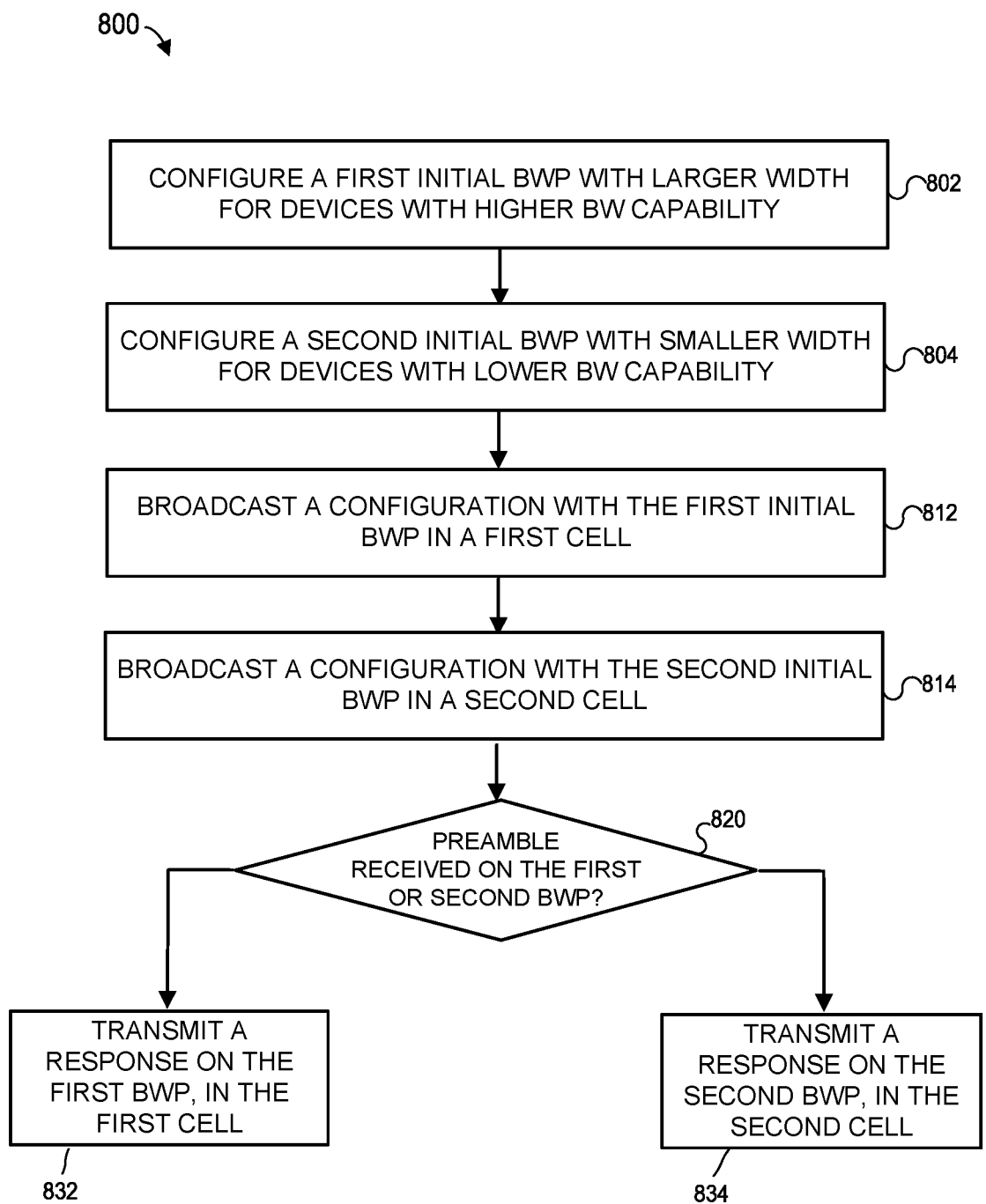
FIG. 8 is a flow diagram of an example method for configuring a first initial BWP in a first cell and a second initial BWP in a second cell, which can be implemented in the base station of FIG. 1B.

At block 1004, the base station configures a second initial BWP of a second width (events 206 and 210 in FIG. 2; events 306 and 314 in FIG. 3; block 604 in FIG. 6; block 804 in FIG. 8). The second initial BWP is also within the bandwidth of the first cell (intervals 412A-C and 400 in FIGS. 4A-C; intervals 512A-C in FIGS. 5A-C).

At block 1006, the base station 104 transmits an indication of the first initial BWP in the first cell and an indication of the second initial BWP in the first or second cell (event 220 in FIG. 2; events 322 and 324 in FIG. 3; block 610 in FIG. 6; block 814 in FIG. 8).

Figure 11:
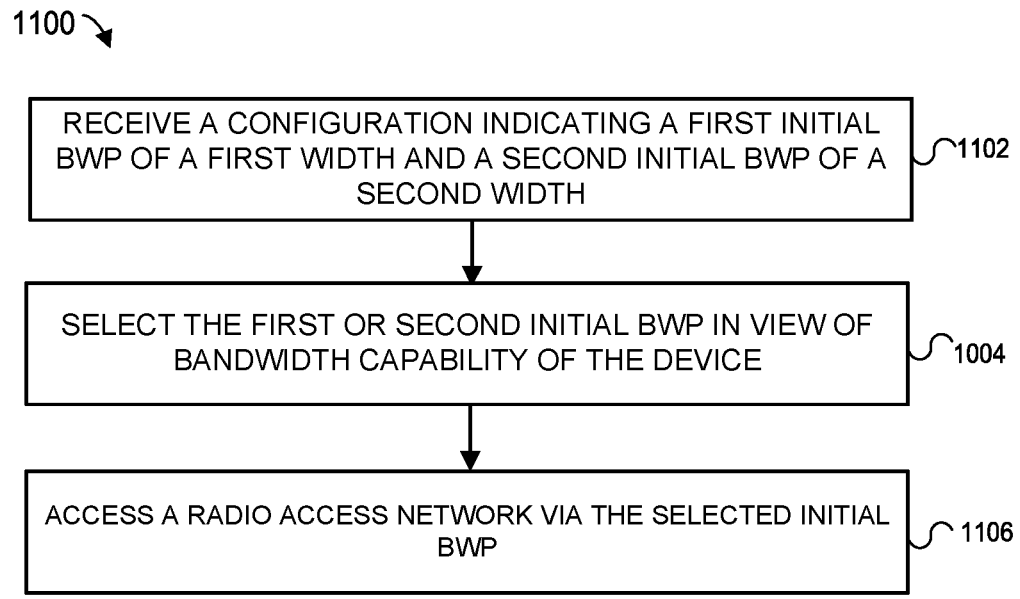
FIG. 11 is a flow diagram of an example method for accessing a RAN, which can be implemented in a UE of FIG. 1A or 1B.

Finally, FIG. 11 illustrates a flow diagram of an example method 1100 for accessing a RAN, which can be implemented in the UE 102A or 102B. At block 1102, the UE 102A or 102B receives a configuration indicating a first initial BWP of a first width and a second initial BWP of a second width (event 220 in FIG. 2; events 322 and 324 in FIG. 3; block 610 in FIG. 6; block 814 in FIG. 8). Next, at block 1104, the UE 102A or 102B selects the first initial BWP or the second initial BWP in view of the UE's bandwidth capability (event 230 or 232 in FIG. 2; event 330 or 332 in FIG. 3; block 704 in FIG. 7; block 914 in FIG. 9). At block 1106, the UE 102A or 102B accesses the RAN via the base station 104, on the selected initial BWP (event 240 or 340 in FIG. 2; event 340 or 342 in FIG. 3; block 706 in FIG. 7).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of aspects reflects another additional embodiment explicitly contemplated by the present disclosure.

Aspect 1. A method in a base station for supporting devices with different bandwidth capabilities comprises configuring, by processing hardware, a first initial bandwidth part (BWP) of a first width within a bandwidth of the first cell; configuring, by the processing hardware, a second initial BWP of a second width different than the first width, within the bandwidth of the first cell; and transmitting, by the processing hardware, an indication of the first BWP in the first cell and an indication of the second BWP in the first cell or a second cell, to cause a first user equipment (UE) having a first bandwidth capability to access the first BWP, and a second UE having a second bandwidth capability to access the second BWP.

Aspect 2. The method of aspect 1, including transmitting, in the first cell, a system information block (SIB) indicating respective locations of the first BWP and the second BWP within the bandwidth of the first cell.

Aspect 3. The method of aspect 1, including transmitting the indication of the first initial BWP in a first SIB in the first cell, and transmitting the indication of the second initial BWP in a second SIB in the second cell.

Aspect 4. The method of aspect 3, further comprising: assigning a first physical cell identity (PCI) to the first cell; and transmitting a first synchronization signal block (SSB) associated with the first PCI on a DL component of the first initial BWP.

Aspect 5. The method of aspect 4, further comprising: assigning a second PCI to the second cell; and transmitting a second SSB associated with the second PCI on a DL component of the second initial BWP.

Aspect 6. The method of any of aspects 3-5, further comprising: configuring the second cell with a bandwidth that is narrower than the bandwidth of the first cell and is entirely within the bandwidth of the first cell.

Aspect 7. The method of any of aspects 3-5, further comprising: configuring the second cell with a bandwidth that is narrower than the bandwidth of the first cell and partially overlaps the first initial BWP of the first cell.

Aspect 8. The method of any of aspects 2-5, further comprising: configuring the second cell with a bandwidth that is narrower than the bandwidth of the first cell and does not overlap the first initial BWP of the first cell.

Aspect 9. The method of any of aspects 1-8, wherein the second initial BWP is entirely within the first initial BWP.

Aspect 10. The method of any of aspects 1-8, wherein the second initial BWP partially overlaps the first initial BWP.

Aspect 11. The method of any of aspects 1-8, wherein the first initial BWP and the second initial BWP do not overlap.

Aspect 12. The method of any of the preceding aspects, wherein configuring each of the first and second initial BWP includes configuring a respective uplink (UL) BWP and a respective downlink (DL) BWP.

Aspect 13. The method of any of the preceding aspects, further comprising: receiving, by the processing hardware, a first random access preamble on a UL portion of the first initial BWP from the first UE; and receiving, by the processing hardware, a second random access preamble on a UL portion of the second initial BWP from the second UE.

Aspect 14. The method of aspect 13, further comprising: transmitting, by the processing hardware over a DL portion of the first initial BWP to the first UE, a configuration for a first non-initial BWP to which the first UE is allowed to switch; and transmitting, by the processing hardware over a DL portion of the second initial BWP to the second UE, a configuration for a second non-initial BWP to which the second UE is allowed to switch.

Aspect 15. A base station comprising processing hardware and configured to implement a method of any of aspects 1-14.

Aspect 16. A method in a UE for accessing a RAN comprises: receiving, by processing hardware, a configuration indicating a first initial bandwidth part (BWP) of a first width and a second initial BWP of a second width; selecting, by the processing hardware, one of the first initial BWP or the second initial BWP in view of a bandwidth capability of the UE; and accessing, by the processing hardware, the RAN via the selected initial BWP.

Aspect 17. The method of aspect 16, including receiving the first initial BWP and the second initial BWP when the UE is in an idle or inactive state of a protocol for controlling radio resources between the UE and the RAN.

Aspect 18. The method of aspect 16, further comprising: receiving, by the processing hardware, a master information block (MIB) of a cell, the MIB specifying a control resource set (CORESET) within the first initial BWP; in response to determining that a width of the CORESET is larger than the bandwidth capability of the UE: not selecting the cell with the MIB, and searching for a new cell.

Aspect 19. The method of any of aspects 16-18, wherein receiving the configuration includes receiving a SIB indicating respective locations of the first BWP and the second BWP within a bandwidth of a cell.

Aspect 20. The method of any of aspects 16-18, wherein receiving the configuration includes: receiving the indication of the first initial BWP in a first SIB in a first cell, and receiving the indication of the second initial BWP in a second SIB in a second cell.

Aspect 21. The method of aspect 20, wherein the second cell has a bandwidth that is narrower than a bandwidth of the first cell and is entirely within the bandwidth of the first cell.

Aspect 22. The method of any of aspects 16-21, wherein receiving the configuration includes receiving an indication that the second initial BWP is entirely within the first initial BWP.

Aspect 23. The method of any of aspects 16-20, wherein receiving the configuration includes receiving an indication that the second initial BWP partially overlaps the first initial BWP.

Aspect 24. The method of any of aspects 16-20, wherein receiving the configuration includes receiving an indication that the first initial BWP and the second initial BWP do not overlap.

Aspect 25. The method of any of aspects 16-24, wherein accessing the RAN includes: transmitting, by the processing hardware, a random access preamble on a UL portion of the selected initial BWP; and receiving, by the processing hardware, a random access response on a DL portion of the selected initial BWP.

Aspect 26. A user equipment comprising processing hardware and configured to implement a method of any of aspects 16-25.

What is claimed is:

1. A method implemented in a base station for supporting devices with different bandwidth capabilities, the method comprising:
   configuring a first initial bandwidth part (BWP) of a first width within a bandwidth of a first cell;
   configuring a second initial BWP of a second width different than the first width, within the bandwidth of the first cell;
   transmitting an indication of the first initial BWP in the first cell and an indication of the second initial BWP in the first cell or a second cell;
   transmitting, in the first cell, a system information block (SIB) indicating respective locations of the first initial BWP and the second initial BWP within the bandwidth of the first cell;
   receiving a first random access preamble on a UL portion of the first initial BWP from a first user equipment (UE) having a first bandwidth capability;
   receiving a second random access preamble on a UL portion of the second initial BWP from a second UE having a second bandwidth capability;
   transmitting, to the first UE, a first response to the first random access preamble on a DL portion of the first initial BWP, to the first UE; and
   transmitting, to the second UE, a second response to the second random access preamble on a DL portion of the second initial BWP.

2. The method of claim 1, wherein the first initial BWP and the second initial BWP do not overlap.

3. The method of claim 1, wherein configuring each of the first and second initial BWP includes configuring a respective uplink (UL) BWP and a respective downlink (DL) BWP.

4. The method of claim 1, further comprising:
   transmitting, over the DL portion of the first initial BWP to the first UE, a configuration for a first non-initial BWP to which the first UE is allowed to switch; and
   transmitting, over the DL portion of the second initial BWP to the second UE, a configuration for a second non-initial BWP to which the second UE is allowed to switch.

5. A base station comprising processing hardware and configured to:
   configure a first initial bandwidth part (BWP) of a first width within a bandwidth of a first cell;
   configure a second initial BWP of a second width different than the first width, within the bandwidth of the first cell;
   transmit an indication of the first initial BWP in the first cell and an indication of the second initial BWP in the first cell or a second cell;
   transmit, in the first cell, a system information block (SIB) indicating respective locations of the first initial BWP and the second initial BWP within the bandwidth of the first cell;
   receive a first random access preamble on a UL portion of the first initial BWP from a first user equipment (UE) having a first bandwidth capability;
   receive a second random access preamble on a UL portion of the second initial BWP from a second UE having a second bandwidth capability;
   transmit, to the first UE, a first response to the first random access preamble on a DL portion of the first initial BWP; and
   transmit, to the second UE, a second response to the second random access preamble on a DL portion of the second initial BWP.

6. The base station of claim 5, wherein the first initial BWP and the second initial BWP do not overlap.

7. The base station of claim 5, wherein configuring each of the first and second initial BWP includes configuring a respective uplink (UL) BWP and a respective downlink (DL) BWP.

8. A method in a user equipment (UE) for accessing a radio access network (RAN), the method comprising:
   receiving, in a system information block (SIB) including a configuration indicating a first initial bandwidth part (BWP) of a first width and a second initial BWP of a second width and indicating respective locations of the first BWP and the second BWP within a bandwidth of a cell;
   selecting one of the first initial BWP or the second initial BWP in view of a bandwidth capability of the UE; and
   accessing the RAN via the selected initial BWP, including:
   transmitting a random access preamble on a UL portion of the selected initial BWP, and
   receiving a random access response on a DL portion of the selected initial BWP.

9. The method of claim 8, including receiving the first initial BWP and the second initial BWP when the UE is in an idle or inactive state of a protocol for controlling radio resources between the UE and the RAN.

10. The method of claim 8, further comprising:
    receiving a master information block (MIB) of a cell, the MIB specifying a control resource set (CORESET) within the first initial BWP;
    in response to determining that a width of the CORESET is larger than the bandwidth capability of the UE:
    not selecting the cell with the MIB, and
    searching for a new cell.

11. The method of claim 8, wherein receiving the configuration includes receiving an indication that the first initial BWP and the second initial BWP do not overlap.

12. A user equipment (UE) comprising processing hardware and configured to:
- receive a system information block (SIB) including a configuration indicating a first initial bandwidth part (BWP) of a first width and a second initial BWP of a second width and indicating respective locations of the first initial BWP and the second initial BWP within a bandwidth of a cell;
- select one of the first initial BWP or the second initial BWP in view of a bandwidth capability of the UE; and
- access the RAN via the selected initial BWP, including:
- transmit a random access preamble on a UL portion of the selected initial BWP, and
- receive a random access response on a DL portion of the selected initial BWP.

13. The UE of claim 12, further configured to:
- receive the first initial BWP and the second initial BWP when the UE is in an idle or inactive state of a protocol for controlling radio resources between the UE and the RAN.

14. The UE of claim 12, further configured to:
- receive a master information block (MIB) of a cell, the MIB specifying a control resource set (CORESET) within the first initial BWP;
- in response to determining that a width of the CORESET is larger than the bandwidth capability of the UE:
- not select the cell with the MIB, and
- search for a new cell.

15. The UE of claim 12, wherein to receive the configuration, the UE is configured to receive an indication that the first initial BWP and the second initial BWP do not overlap.

* * * * *